United States Patent Office 2,916,772
Patented Dec. 15, 1959

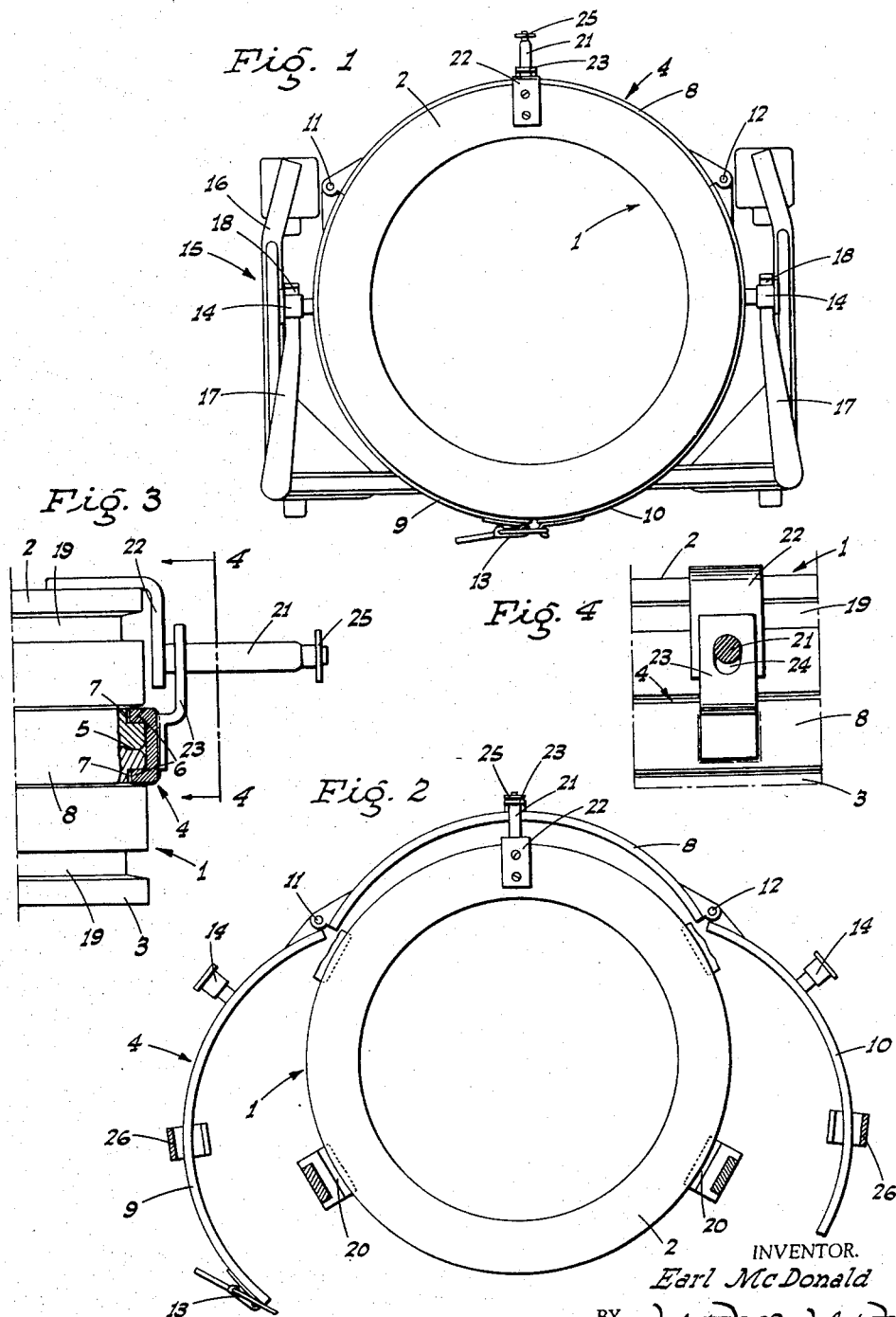

2,916,772

LOCKING RING LOCATING AND GUIDE UNIT FOR PORTABLE TIRE RETREADING MOLDS

Earl McDonald, Stockton, Calif., assignor to Super Mold Corporation of California, Lodi, Calif., a corporation of California Application December 29, 1958, Serial No. 783,243

5 Claims. (Cl. 18—43)

This invention relates in general to an improvement in a portable, full-circle or band-type tire retreading mold which includes annular body-half or matrix sections which together define an endless tire receiving cavity; there being a hinged, segmental locking ring normally but releasably catch-closed in surrounding relation to the mold circumferentially and centrally of its sides, whereby to then secure the matrix sections in matching engagement and against axial separation. When the locking ring is in such securing relation to the matrix sections, the mold is held closed for retreading of a tire therein.

The locking ring is released and disengaged from the matrix sections to permit of relative axial movement of the latter during opening and closing of the mold and which is accomplished—for example—in the press shown in copending application, Serial No. 781,303, filed December 18, 1958; the major object of the present invention being to provide a novel locating and guide unit which supports the released and disengaged locking ring—at a certain point in its circumference—in a predetermined position relative to one of the matrix sections whereby, after the mold has been opened and closed, and the matrix sections re-assembled, to facilitate manual return of said ring to proper position for ready re-locking of said ring centered on the mold and in securing relation to said matrix sections.

Another important object of this invention is to provide a locking ring locating and guide unit, as above, which includes a stud secured in connection with, and projecting radially outwardly from, said one matrix section, and an adjacent segment of the locking ring having an element thereon supported from, and slidable along, such stud whereby said adjacent segment, which is moved outwardly when the ring is disengaged from the matrix sections, is supported and guided—in the zone of such stud—for return or inward movement into correct and alined engagement with said matrix sections when the ring is re-engaged therewith by manipulation of other segments of said ring. By so supporting and guiding one segment thereof, the entire ring can be manually re-located and re-engaged about the mold in a much more expeditious manner than otherwise.

A further object of the invention is to provide a locking ring locating and guide unit, for portable tire retreading molds, which—while relatively simple in construction—is nevertheless very effective for the intended purpose.

It is also an object of the invention to provide a practical and reliable locking ring locating and guide unit, and one which will be exceedingly effective for the purpose for which it is designed.

These objects are accomplished by means of such structure and relative arrangement of parts as will fully appear by a perusal of the following specification and claims.

In the drawings:

Fig. 1 is a plan view of the mold as horizontally supported on a dolly; the locking ring being shown as engaged.

Fig. 2 is a plan view of the mold as detached from the dolly and as horizontally supported for relative axial movement of the matrix sections upon opening and closing of the mold; the locking ring being shown released.

Fig. 3 is a fragmentary enlarged elevation of the mold, partly broken out and in section, showing particularly the locking ring and the locating and guide unit associated therewith.

Fig. 4 is a fragmentary section on line 4—4 of Fig. 3.

Referring now more particularly to the drawings and to the characters of reference marked thereon, the mold, which embodies the present invention, is indicated generally at 1; such mold being of portable, full-circle or band-type, and including—in normally matching engagement—endless, annular body-half or matrix sections 2 and 3, which together form an endless tire receiving cavity (not shown).

The matchingly engaged matrix sections 2 and 3 are normally but releasably secured together in unitary relation by a full-circle but segmental locking ring, indicated generally at 4; such locking ring surrounding the mold centrally and in lapping relation to the line of abutment 5 between said matrix sections 2 and 3.

The locking ring 4 is of inwardly opening channel form, with the flanges 6 engaged in peripheral grooves 7 in the related matrix sections. The locking ring 4 is of three-part and comprises—by reference to the mold when horizontal—an intermediate or rear segment 8 and forward segments 9 and 10; the forward segments 9 and 10 being hinged—at their rear ends—to the adjacent ends of the rear segment 8, as at 11 and 12, respectively.

At their other or front ends the forward segments 9 and 10 are normally connected together by a releasable catch 13. When the catch 13 is engaged, with the locking ring 4 surrounding the mold with the flanges 6 in the peripheral grooves 7 of the matrix sections, the latter are locked against axial separation and the mold is closed.

The locking ring 4 is provided—at opposed points in the circumference thereof, and on the forward segments 9 and 10—with laterally outwardly projecting side trunnions 14. These trunnions 14 serve the purpose of supporting the mold from a dolly, indicated generally at 15; the dolly including a caster-supported base frame 16, and elevated overhanging horizontal arms 17 formed adjacent their free ends with cradles 18 in which said trunnions 14 seat.

When the mold 1 is supported horizontally by the dolly 15, the catch 13 is disposed at what may be considered the front of the mold 1; such dolly being used to transport said mold to and from the press shown in the above identified copending application, and which press is employed—in the manner particularly described in said application—to open and close the mold by engaging and relatively axially moving the matrix sections 2 and 3 after the locking ring 4 has been released and disengaged from said matrix sections.

When the mold 1 is horizontally supported in a press or the like, and preparatory to opening and closing of said mold, the trunnions 14 are no longer cradle-engaged on the dolly arms 17, and said mold is engaged by securing elements which seat in circumferential grooves 19 in the matrix sections 2 and 3. The mold in such position is shown more or less diagrammatically in Fig. 2, and wherein the securing elements are dogs 20 run into said grooves 19.

By virtue of the foregoing illustration it will be recognized that when the mold 1 is so supported, either in a press or otherwise, the locking ring 4 is capable of disengagement and re-engagement without obstruction. Thus, when the catch 13 is released, and the locking ring 4 disengaged from the matrix sections 2 and 3 by spreading the forward segments 9 and 10 and shifting them rearwardly with the rear segment 8, it is desired to then maintain such ring at a given point at the rear in a predetermined located position relative to the matrix section 2 for easy and guided re-engagement of said ring with both matrix sections when they are brought back into engagement upon closing of the mold. This is accomplished by the following locating and guide unit:

The matrix section 2, which is uppermost when the mold is disposed horizontally, is fitted with a radially outwardly projecting rear stud 21 carried on an in-turned bracket 22 fixed to said matrix section 2. The rear segment 8 is provided—at the rear, i.e., centrally of its ends—with an out-turned or upstanding bracket 23 which laps but lies outwardly of the bracket 22; said bracket 23 having a bore 24 through which the stud 21 relatively slidably projects. At its outer end the stud 21 is provided with a stop 25.

In order to disengage the locking ring 4 from the mold 1, the operator—standing in front of said mold, i.e. adjacent the catch 13—first releases such catch and thereafter grasps the forward segments 9 and 10, spreads them apart, and pushes rearwardly thereon, which causes disengagement of the rear segment 8; such rear segment riding rearwardly in guided and located relation to the matrix section 2, and by reason of the above described bracket and stud arrangement.

After this has been accomplished the spread-apart forward segments 9 and 10 are placed in suitable fixed supports 26, and which—in the press of the hereinbefore identified copending application—are hook-type hangers. The locking ring 4 as thus released is effectively supported clear of the mold 1, with the rear segment 8 maintained in the zone of the stud 21, in predetermined location relative to the matrix section 2. As will be seen from the drawings, particularly Fig. 3, the diameter of the stud 21 is reduced considerably just in front of the stop 25, and for an axial extent greater than the thickness of the bracket 23 which slides on said stud. By reason of this feature, when the locking ring is opened up from the front and pushed back so that the bracket 23 slides along stud 21 and engages the stop 25, said bracket will drop down onto the reduced-diameter portion of the stud. This releasably locates the rear or intermediate segment 8 of the locking ring against undesired forward sliding movement such as might be occasioned by vibration or other disturbing factors, and which movement—if undetected—might prevent, or interfere with, the downward closing movement of the upper matrix section after having been lifted.

After the mold has been opened for tire unloading and reloading and is thereafter closed (at which time the matrix sections 2 and 3 again matchingly abut), the locking ring 4 is re-engaged. To accomplish this, the operator grasps the forward segments 9 and 10 of said locking ring, lifts said forward segments out of the supports 26 and then pulls forwardly while holding said forward segments in substantially the horizontal plane of the rear studs 21. This results in the rear segment 8—by virtue of its guiding on the rear stud 21—readily re-engaging in the peripheral grooves 19 of both matrix sections.

Thereafter, the forward segments 9 and 10 are swung inwardly, and likewise re-engaged in the grooves 19, whereupon the catch 13 is recoupled, completing the locking of ring 4 about the matrix sections 2 and 3 of the closed mold.

By reason of the described locating and guide unit, the locking ring 4 can be readily brought into correct orientation with the matrix sections, and said ring re-engaged about the mold much more conveniently than otherwise.

From the foregoing description it will be readily seen that there has been produced such a device as will substantially fulfill the objects of the invention as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful, and upon which Letters Patent are desired:

1. A locking ring locating and guide unit for a retreading mold comprised of annular matching matrix sections and a disengageable locking ring normally surrounding the mold in a predetermined plane circumferentially thereof and releasably securing the matrix sections against axial separation, the locking ring being of hinged segmental form, and the segments being moved outwardly of the mold upon disengagement of said ring therefrom; said unit comprising a stud fixed in connection with one matrix section and radiating from the periphery thereof, and a bracket fixed in connection with the ring and extending toward the stud, the bracket having a bore through which the stud relatively slidably projects.

2. A locking ring locating and guide unit for a retreading mold comprised of annular matching matrix sections and a disengageable locking ring normally surrounding the mold in a predetermined plane circumferentially thereof and releasably securing the matrix sections against axial separation, the locking ring being of hinged segmental form, and the segments being moved outwardly of the mold upon disengagement of said ring therefrom; said unit comprising a stud fixed in connection with one matrix section and radiating from the periphery thereof, the locking ring having an intermediate segment, and a bracket fixed on said intermediate segment centrally of its ends and extending toward the stud, the bracket having a bore through which the stud relatively slidably projects.

3. A locking ring locating and guide unit for a retreading mold comprised of annular matching matrix sections and a disengageable locking ring normally surrounding the mold in a predetermined plane circumferentially thereof and releasably securing the matrix sections against axial separation, the locking ring being of hinged segmental form, and the segments being moved outwardly of the mold upon disengagement of said ring therefrom; said unit comprising adjacent brackets fixed on one matrix section and the locking ring, said brackets lapping outwardly of the periphery of said one matrix section with the bracket on the ring outermost, and a radial outwardly projecting stud fixed on the bracket on said one matrix section, the bracket on the ring having a bore through which the stud relatively slidably projects.

4. A unit, as in claim 1, with an enlarged stop on the outer end of the stud; the diameter of the stud immediately in front of the stop being materially reduced for an axial extent not less than the thickness of the bracket.

5. A locking ring locating and guide unit for a retreading mold comprised of annular matching matrix sections and a disengageable locking ring normally surrounding the mold in a predetermined plane circumferentially thereof and releasably securing the matrix sections against axial separation, the locking ring comprising three segments the intermediate one of which is hinged at its ends to the adjacent ends of the other segments, all said segments being moved outwardly of the mold upon disengagement of the locking ring therefrom; said unit comprising a member fixed on one matrix section and an adjacent member fixed on the intermediate segment of the ring, one member being slidably engaged by the other, and said members being disposed to guide said intermediate segment in the zone of said members for movement in such plane.

References Cited in the file of this patent

FOREIGN PATENTS

| 142,021 | Great Britain | Apr. 29, 1920 |
| 664,608 | Great Britain | Jan. 9, 1952 |